United States Patent

Shoji

[11] Patent Number: 5,539,814
[45] Date of Patent: Jul. 23, 1996

[54] METHOD AND APPARATUS FOR INFORMING ACTIVE SUBSCRIBER OF DISCONNECTION OF HELD SUBSCRIBER IN CALL-WAITING SERVICE

[75] Inventor: Shuichi Shoji, Kawasaki, Japan

[73] Assignee: Fujitsu Limited, Kawasaki, Japan

[21] Appl. No.: 485,118

[22] Filed: Jun. 7, 1995

Related U.S. Application Data

[63] Continuation of Ser. No. 894,934, Jun. 8, 1992, abandoned.

[30] Foreign Application Priority Data

Jun. 13, 1991 [JP] Japan ................................. 3-141554

[51] Int. Cl.$^6$ .................................................. H04M 3/42
[52] U.S. Cl. ........................... 379/215; 379/201; 379/393; 379/257
[58] Field of Search ..................................... 379/215, 162, 379/163, 393, 202, 205, 206, 201, 257

[56] References Cited

U.S. PATENT DOCUMENTS

| | | | |
|---|---|---|---|
| 3,742,151 | 6/1973 | Ruether | 379/163 |
| 4,001,520 | 1/1977 | Waldman et al. | 379/393 |
| 5,195,087 | 3/1993 | Bennett et al. | 379/202 |

FOREIGN PATENT DOCUMENTS

| | | |
|---|---|---|
| 61-184036 | 8/1986 | Japan . |
| 3-29546 | 2/1991 | Japan . |

*Primary Examiner*—Ahmad F. Matar
*Attorney, Agent, or Firm*—Staas & Halsey

[57] ABSTRACT

When a subscriber A provided with a call-waiting service and connected to a subscriber B is called by another subscriber C and when the subscriber A responds to a call-waiting tone, the subscriber A is connected to the subscriber C and the subscriber B is held according to a procedure of the call-waiting service. If the subscriber B replaces the handset, a clearing intrusion tone (CIT) is sent to the subscriber A before changing a three-way connection to a connection between the subscriber A and the subscriber C, and the subscriber A notices that the held subscriber B is disconnected before attempting to communicate with the subscriber B and without having to rely on a busy signal.

4 Claims, 4 Drawing Sheets

5,539,814

METHOD AND APPARATUS FOR INFORMING ACTIVE SUBSCRIBER OF DISCONNECTION OF HELD SUBSCRIBER IN CALL-WAITING SERVICE

This application is a continuation of application Ser. No. 07/894,934, filed Jun. 8, 1992, (now abandoned).

BACKGROUND OF THE INVENTION

1. Field of the Invention

The present invention relates to a method and an apparatus for informing an active subscriber of the disconnection of a held subscriber in a call-waiting service.

2. Description of the Related Art

A call-waiting service is widely utilized as one of the services provided by a central office exchange. In the call-waiting service, when a subscriber A talking with a subscriber B is called by another subscriber C, a call-waiting tone (CWT) is sent to the talking subscriber A if the subscriber A is provided with the call waiting service, to thus inform the subscriber A of a call by another subscriber. If the subscriber A presses the switchhook (hooking) of a telephone set, the subscriber A is connected to the calling subscriber C and the subscriber B is held. In this situation, if the subscriber A presses the switchhook (hooking), the subscriber A is again connected to the subscriber B and the subscriber C is held.

The above conventional call-waiting service has the following shortcomings. Normally, the held subscriber B maintains an off-hook state until the held subscriber B is released. However, if the held subscriber B wishes to terminate a conversation with the subscriber A and hooks the handset on the telephone set, the subscriber A does not notice that the subscriber B has been disconnected until the subscriber A attempts to talk with the subscriber B who has been disconnected and therefore the subscriber A hears a busy tone (BT). Thus, the subscriber A is obliged to press the switchhook and hear the BT even when the held subscriber B is disconnected.

SUMMARY OF THE INVENTION

It is an object of the present invention to provide a method and an apparatus for informing an active subscriber of the disconnection of a subscriber who has been held in a call-waiting service.

In accordance with the present invention there is provided a method of informing a first subscriber provided with a call-waiting service, and connected to a second subscriber, of the disconnection of a third subscriber who has been held; the first, second and third subscriber being connected through a three-way connection, comprising the steps of:

detecting the disconnection of the third subscriber, sending a signal to the first subscriber, and changing the three-way connection to a connection between the first and the second subscribers.

In accordance with the present invention there is also provided an apparatus for informing a first subscriber provided with a call-waiting service and connected to a second subscriber, of the disconnection of a third subscriber who has been held; the first, second and third subscriber being connected through a three-way connection, comprising:

means for detecting the disconnection of the third subscriber, means for sending a signal to the first subscriber if the detecting means detects the disconnection, and means for changing the three-way connection to a connection between the first and the second subscribers after the sending means sends the signal.

DESCRIPTION OF THE PREFERRED EMBODIMENTS

Figure 1:
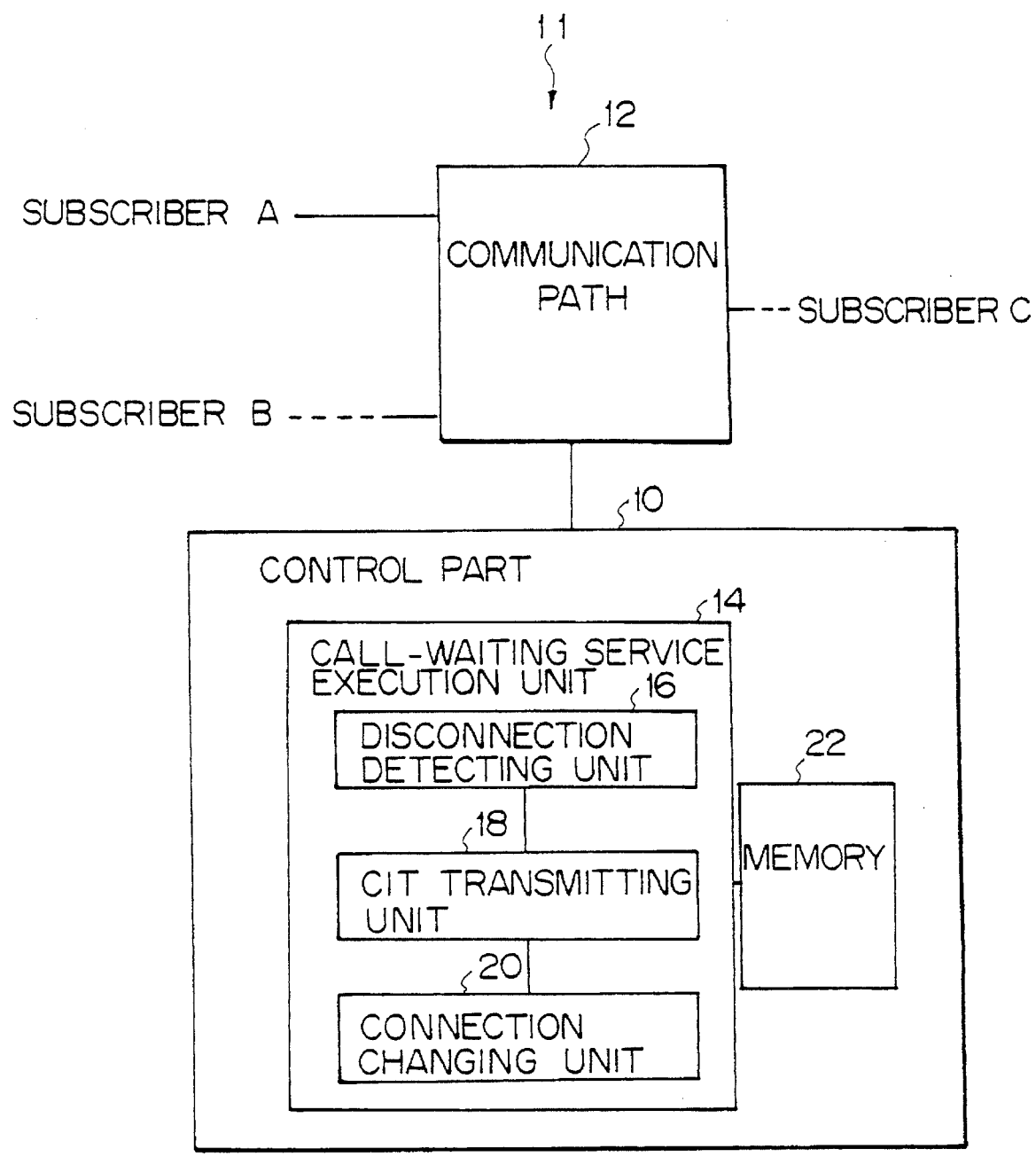
FIG. 1 is a block diagram of an apparatus according to an embodiment of the present invention.

FIG. 1 is a block diagram showing the construction of an apparatus for informing a subscriber of a disconnection according to an embodiment of the present invention.

The reference numeral 10 denotes a control part of a central office exchange 11 and the reference numeral 12 denotes a communication path formed within the exchange 11. The control part 10 comprises a call-waiting service execution unit 14 for performing a call-waiting service having a disconnection detecting unit 16, a clearing intrusion tone (CIT) transmitting unit 18, and a connection changing unit 20. The control part 10 also comprises a memory 22.

In FIG. 1, a subscriber A is accommodated to the exchange 11 and is provided with the call-waiting service by the exchange 11. While the subscriber A is talking with a subscriber B accommodated to the exchange 11 or to another exchange, if the subscriber A is called by another subscriber C accommodated to the exchange 11 or to another exchange, the call-waiting service execution unit 14 is activated. The call-waiting service execution unit 14 performs a call-waiting service similar to the conventional system. Namely, the call-waiting service execution unit 14 forms a three-way connection and sends a call-waiting tone (CWT) through the communication path 12 to the subscriber A. If the subscriber A presses the switchhook of the telephone set, the call-waiting service execution unit 14 connects the subscriber A to the subscriber C and sends a holding tone (HT) to the subscriber B. These connection states are stored in the memory 22.

The subscriber B hearing the HT will maintain the off-hook state if the subscriber B waits until the subscriber B is again connected to the subscriber A. If the subscriber B wishes to end a conversation with subscriber A, the subscriber B will hook the handset on the telephone set to disconnect. Then, the exchange 11 recognizes said disconnection and informs the control part 10 of the same. If the subscriber B is accommodated to another exchange, information of the disconnection is sent from that exchange to the exchange 11.

The received disconnection information is sent to the disconnection detecting unit 16 of the call-waiting service execution unit 14, and the disconnection detecting unit 16 activates the CIT transmitting unit 18. The CIT transmitting unit 18 finds, from the contents of the memory 22, that the party formerly connected to the subscriber B is the subscriber A, and performs a connection control to send the CIT to the subscriber A to inform the subscriber A of the disconnection of the subscriber B who has been on hold.

Hearing the CIT, the subscriber A notices that the subscriber B with whom the subscriber A was formerly talking has been disconnected. In the call-waiting service executing unit 14, after the CIT is sent, the connection changing unit 20 changes the three-way connection to a normal connection between the subscriber A and the subscriber C and terminates the execution of the call-waiting service.

Figure 2:
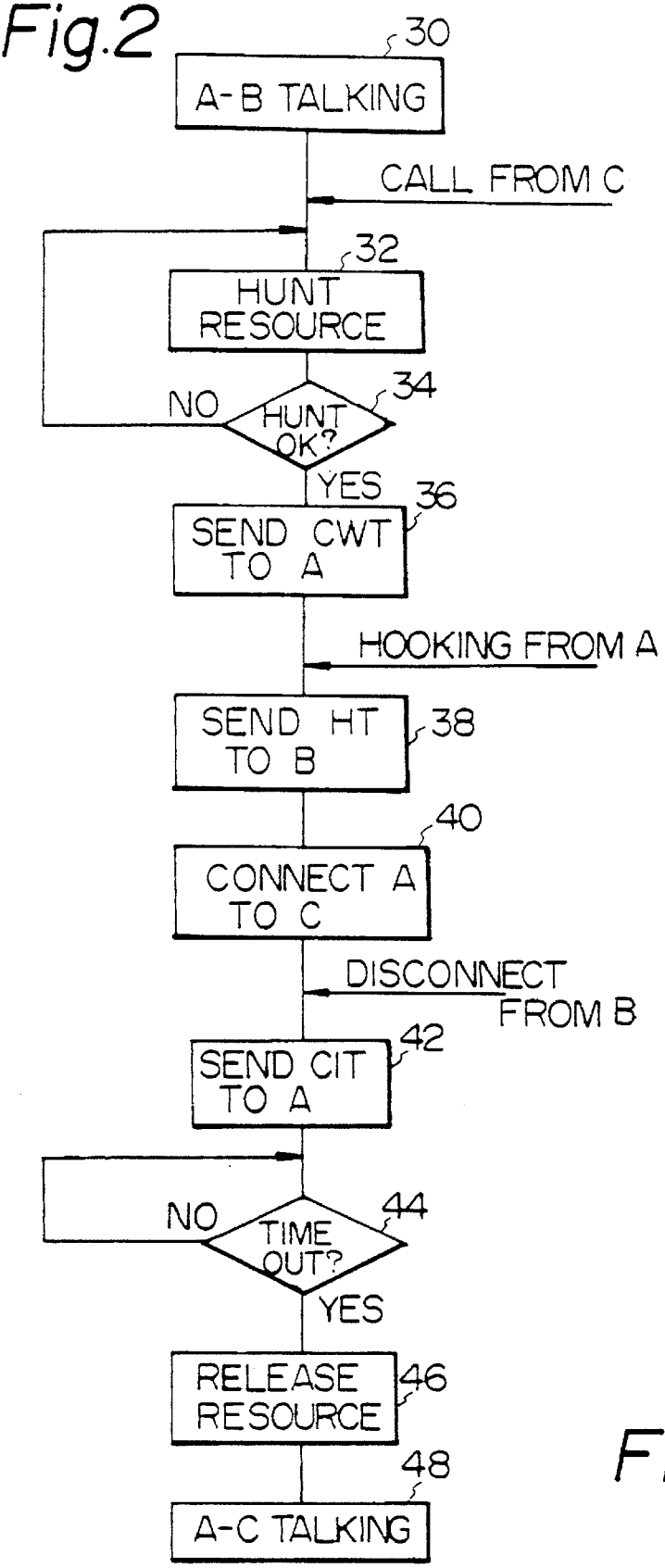
FIG. 2 is a flow chart of a method according to an embodiment of the present invention.

FIG. 2 is a flow chart showing a method according to an embodiment of the present invention, and FIGS. 3A to 3E are diagrams showing state transition of resources in each step of FIG. 2.

Figure 3A:
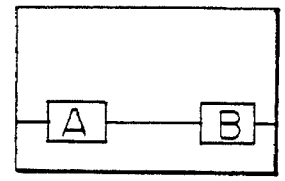
FIGS. 3A to 3E are diagrams showing the transition of resources in each step of FIG. 2.

In step 30 of FIG. 2, the subscriber A is talking with the subscriber B. In this state, a trunk from the subscriber A is connected to a trunk from the subscriber B as shown in FIG. 3A.

Figure 3B:
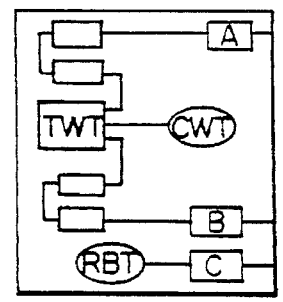

When the subscriber A is called by the subscriber C, the call-waiting service is activated, and resources such as a three-way trunk (TWT) are hunted in step 32. If the hunt of the resources is successful in step 34, a control for sending a CWT to the subscriber A is executed in step 36. As a result, as shown in FIG. 3B, the trunk from the subscriber A and the trunk from the subscriber B are connected to two terminals of the TWT, respectively, and the CWT is connected to the other terminal of the TWT toward the subscriber A. A ringback tone (RBT) is connected to a trunk from the subscriber C.

Figure 3C:
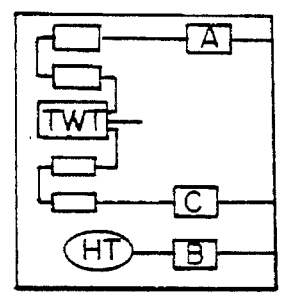

If the subscriber A presses the switchhook of the telephone set to request to be connected to the subscriber C, a control for connecting a holding tone (HT) to the subscriber B (step 38) and for connecting the subscriber A to the subscriber C (step 40) is executed. As a result, as shown in FIG. 3C, the trunk from the subscriber A and the trunk from the subscriber C are connected to two terminals of the TWT, respectively, and the HT is connected to the trunk from the subscriber B.

After that, if disconnection information from the subscriber B is detected, or if disconnection information is received from an exchange accommodating the subscriber B such as in the case where the subscriber B is accommodated to a different exchange from that of the subscriber A, a control for sending a clearing intrusion tone (CIT) to the talking subscriber A is available in step 42. The CIT may be an audio frequency signal interrupted at predetermined intervals. The CIT is sent to the subscriber A until timer runout occurs in step 44.

Figure 3D:
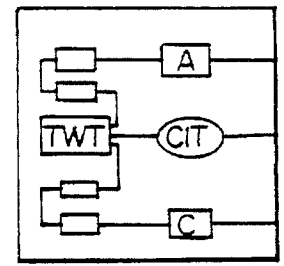

During this time, as shown in FIG. 3D, a CIT is connected to the other terminal of the TWT, and transmission of the HT to the subscriber B has already stopped.

Figure 3E:
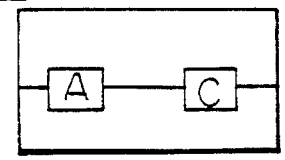

After the timer runout occurs, a control for releasing resources, such as the TWT, is executed in step 46, and a normal connection is formed between the subscriber A and the subscriber C, as shown in FIG. 3E.

Operation sequences, in the case that the subscriber B, with whom the subscriber A accommodated to an exchange A and provided with the call-waiting service first talks, is accommodated to a different exchange B and the subscriber C intruding into the talk is accommodated to another different exchange C are described with reference to FIGS. 4 and 5.

Figure 4:
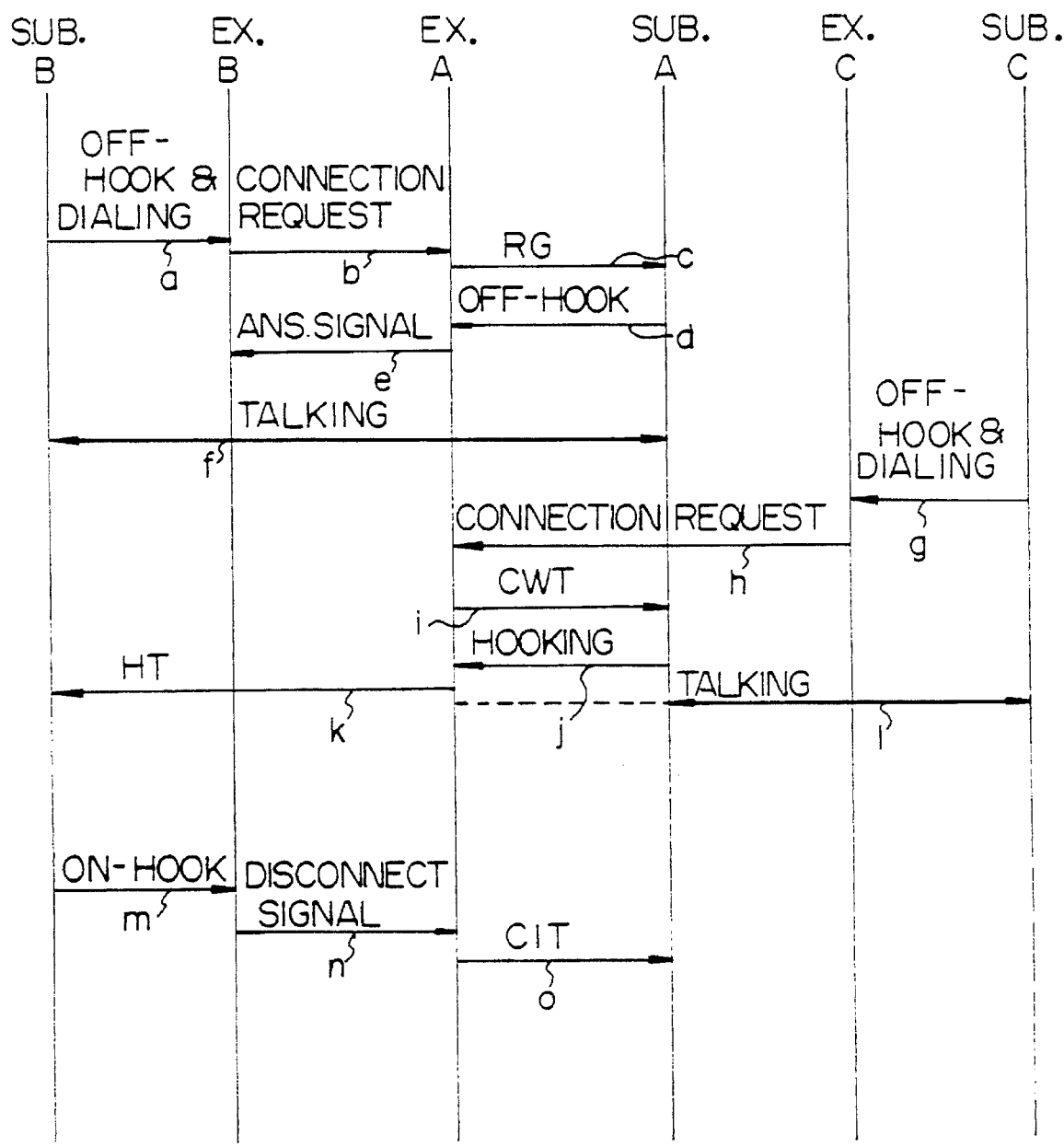
FIG. 4 is a diagram showing an operation sequence where a held subscriber is a calling party.

FIG. 4 is a diagram showing the operation sequence when the subscriber B is a calling party. In FIG. 4, if the subscriber B off-hooks the handset and dials a telephone number of the subscriber A as indicated by "a", a connection request signal is sent from the exchange B to the exchange A as indicated by "b", and a ringing signal (RG) is sent to the subscriber A as indicated by "c". If the subscriber A off-hooks the handset, an answer signal is sent from the exchange A to the exchange B and a connection between the subscriber A and the subscriber B is formed, as indicated by "d" to "f". In this situation, if the subscriber C off-books handset and dials the telephone number of the subscriber A, a connection request signal is sent from the exchange C to the exchange A, a call-waiting service is activated in the exchange A, and a call-waiting tone (CWT) is sent to the subscriber A, as indicated by "g" to "i".

Upon hearing the CWT, if the subscriber A presses the switchhook of the telephone set ("j"), a holding tone (HT) is sent to the subscriber B ("k"), and a connection between the subscriber B and the subscriber C is formed ("l"). After that, if the held subscriber B replaces the handset on the telephone set to be disconnected ("m"), the exchange B detects the same and sends a disconnect signal to the exchange A ("n"). Upon receiving the disconnect signal, the exchange A sends a clearing intrusion tone (CIT) to the subscriber A ("o").

Figure 5:
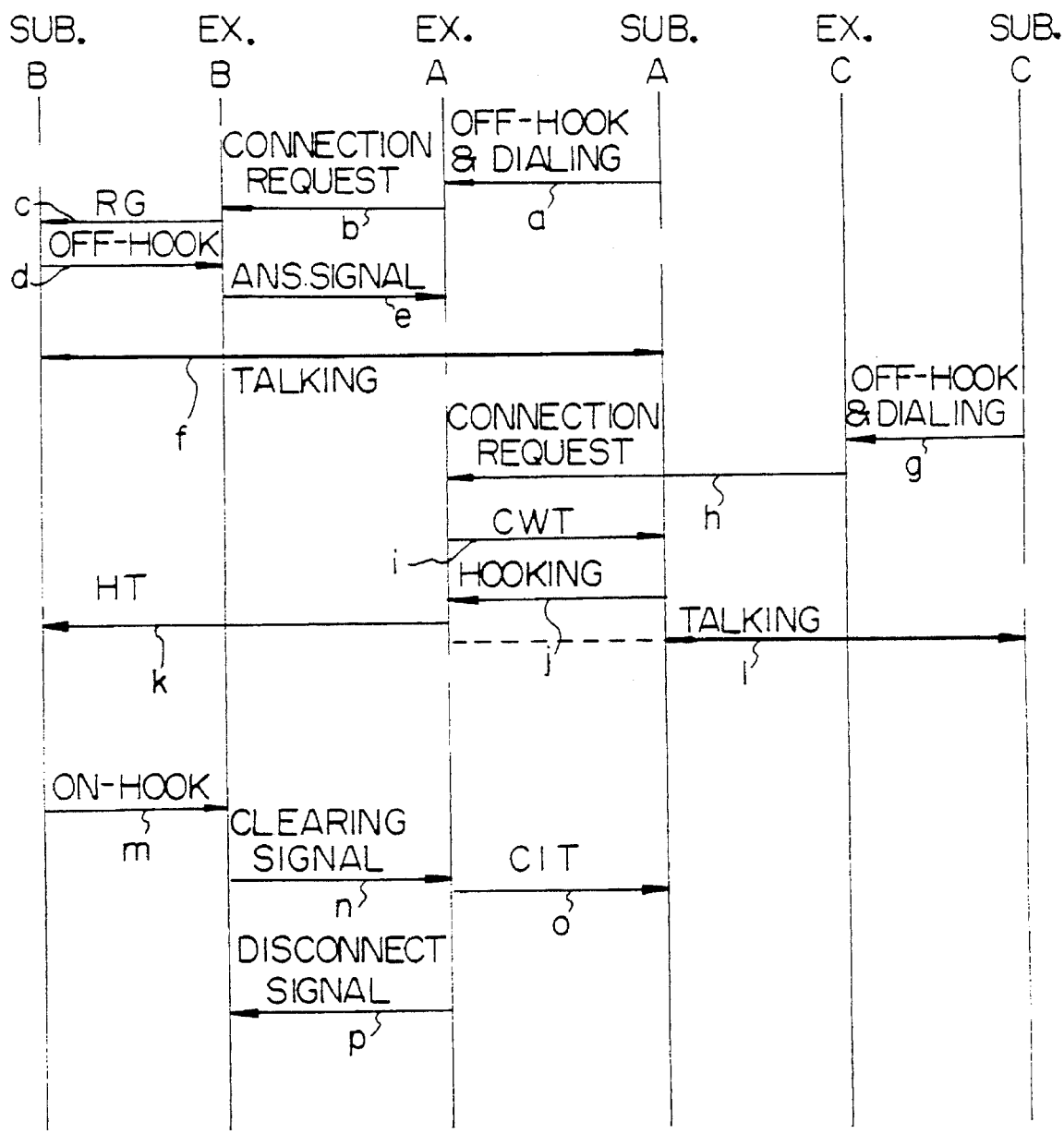
FIG. 5 is a diagram showing an operation sequence where the held subscriber is a called party.

FIG. 5 is a diagram showing the operation sequence when the subscriber B is a called party. In FIG. 5, if the subscriber A off-hooks the handset and dials a telephone number of the subscriber B, a connection request signal is sent from the exchange A to the exchange B and the subscriber B is called ("a" to "c"). If the subscriber B off-hooks the handset and an answer signal is sent from the exchange B to the exchange A, a connection between the subscriber A and the subscriber B is formed ("d" to "f"). After that, similar to FIG. 4, if the subscriber C calls the subscriber A, a connection request signal having the destination of the subscriber A is sent to the exchange A and a CWT is sent to the subscriber A ("g" to "i"). If the subscriber A presses a switchhook, the HT is sent to the subscriber B and a connection between the subscriber A and the subscriber C is formed ("j" to "l").

If the subscriber B replaces the handset on the telephone set, a clearing signal is sent to the exchange A after a time-out check because the subscriber B is a called party ("m" and "n"). Upon receiving the clearing signal, the exchange A sends the CIT to the subscriber A ("o"), and following that, the exchange A sends a disconnect signal to the exchange and a disconnect operation is completed ("p").

I claim:

1. A method of informing a first subscriber provided with a call-waiting service and connected to a second subscriber, of disconnection of a third subscriber who has been held, comprising the steps of:

connecting the first and the second subscribers to a three-way trunk to thereby connect the first subscriber to the second subscriber and the third subscriber is placed on hold, detecting the disconnection of the third subscriber, sending a clearing tone through the three-way trunk to the first subscriber to inform the first subscriber of the disconnection of the third subscriber, and changing connection of the first subscriber, the second subscriber and the third subscriber to a connection between the first and the second subscribers.

2. A method as claimed in claim 1, wherein the clearing tone sent in the sending step is an audio frequency signal transmitted for a predetermined period.

3. An apparatus for informing a first subscriber provided with a call-waiting service and connected to a second subscriber, of disconnection of a third subscriber who has been held, comprising:

- a three-way connection connecting by way of a communication path the first and the second subscribers to a three-way trunk to thereby connect the first subscriber to the second subscriber and the third subscriber is placed on hold;
- means for detecting the disconnection of the third subscriber;
- means for sending a clearing tone through the three-way trunk to the first subscriber by way of the communication path to inform the first subscriber of the disconnection of the third subscriber if the detecting means detects the disconnection, wherein the detecting means is coupled to the sending means; and
- means for changing the three-way connection to a connection between the first and the second subscribers after the sending means sends the clearing tone, wherein the sending means is coupled to the changing means.

4. An apparatus as claimed in claim 3, wherein the clearing tone sent by the sending means is an audio frequency signal transmitted for a predetermined period.

* * * * *